US012776452B2

(12) United States Patent
Tomimatsu et al.

(10) Patent No.: US 12,776,452 B2
(45) Date of Patent: Oct. 27, 2026

(54) SOLID ELECTROLYTIC CAPACITOR ELEMENT AND SOLID ELECTROLYTIC CAPACITOR

(71) Applicant: Panasonic Intellectual Property Management Co., Ltd., Kadoma (JP)

(72) Inventors: Yuta Tomimatsu, Shiga Ken (JP); Masamichi Inoue, Osaka Fu (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 122 days.

(21) Appl. No.: 18/722,921

(22) PCT Filed: Oct. 24, 2022

(86) PCT No.: PCT/JP2022/039565

§ 371 (c)(1), (2) Date: Jun. 21, 2024

(87) PCT Pub. No.: WO2023/119843

PCT Pub. Date: Jun. 29, 2023

(65) Prior Publication Data

US 2025/0054707 A1 Feb. 13, 2025

(30) Foreign Application Priority Data

Dec. 22, 2021 (JP) ................................. 2021-208614

(51) Int. Cl.
*H01G 9/042* (2006.01)
*H01G 9/10* (2006.01)
(Continued)

(52) U.S. Cl.
CPC ............. *H01G 9/0425* (2013.01); *H01G 9/15* (2013.01); *H01G 9/10* (2013.01); *H01G 9/26* (2013.01)

(58) Field of Classification Search
CPC .......... H01G 9/0425; H01G 9/15; H01G 9/10; H01G 9/26; H01G 9/012; H01G 9/052;
(Continued)

(56) References Cited

U.S. PATENT DOCUMENTS

2008/0030929 A1* 2/2008 Chacko .................. H01G 9/012 361/523
2013/0114184 A1* 5/2013 Kochi .................... H01G 9/012 361/524
(Continued)

FOREIGN PATENT DOCUMENTS

CN 107331521 A * 11/2017 ............... H01G 9/10
DE 2745985 A * 4/1978
(Continued)

OTHER PUBLICATIONS

International Search Report dated Jan. 24, 2023, issued in counterpart International Application No. PCT/JP2022/039565 (5 pages).
(Continued)

*Primary Examiner* — Timothy J. Dole
(74) *Attorney, Agent, or Firm* — WHDA, LLP

(57) ABSTRACT

A solid electrolytic capacitor element includes an anode body, a dielectric layer that is formed on the surface of the anode body, and a cathode part that covers at least a portion of the dielectric layer. The cathode part includes a solid electrolyte layer that covers at least a portion of the dielectric layer, and includes a metallic particle-containing layer that contains metallic particles and a cured resin binder in at least a portion of the cathode part. The metallic particles include first metallic particles each containing silver and second metallic particles each containing silver. The first metallic particles each includes a core and a silver-containing coating layer that coats the core. Each of the second metallic
(Continued)

particles is at least one selected from the group consisting of a silver particle and a silver alloy particle.

11 Claims, 1 Drawing Sheet

(51) Int. Cl.
*H01G 9/15* (2006.01)
*H01G 9/26* (2006.01)

(58) Field of Classification Search
CPC .......... H01G 9/048; H01G 9/055; H01G 9/08; H01G 11/48
See application file for complete search history.

(56) References Cited

U.S. PATENT DOCUMENTS

2014/0334071 A1* 11/2014 Endo ...................... H01G 9/042 252/500
2015/0228412 A1* 8/2015 Choi ...................... H01G 9/048 361/529
2023/0170105 A1 6/2023 Esaki
2023/0170155 A1 6/2023 Esaki
2023/0343481 A1 10/2023 Esaki
2023/0352248 A1 11/2023 Esaki
2023/0352249 A1 11/2023 Esaki

FOREIGN PATENT DOCUMENTS

JP H03-009508 A 1/1991
JP H1192739 A * 4/1999 ............... H01L 9/10
JP 2006-253169 A 9/2006
JP 2011-216795 A 10/2011
JP 2016-110939 A 6/2016
WO 2021/220976 A1 11/2021

OTHER PUBLICATIONS

Office Action dated Jun. 2, 2026, issued in counterpart JP Application No. 2023-569109. (4 pages).

* cited by examiner

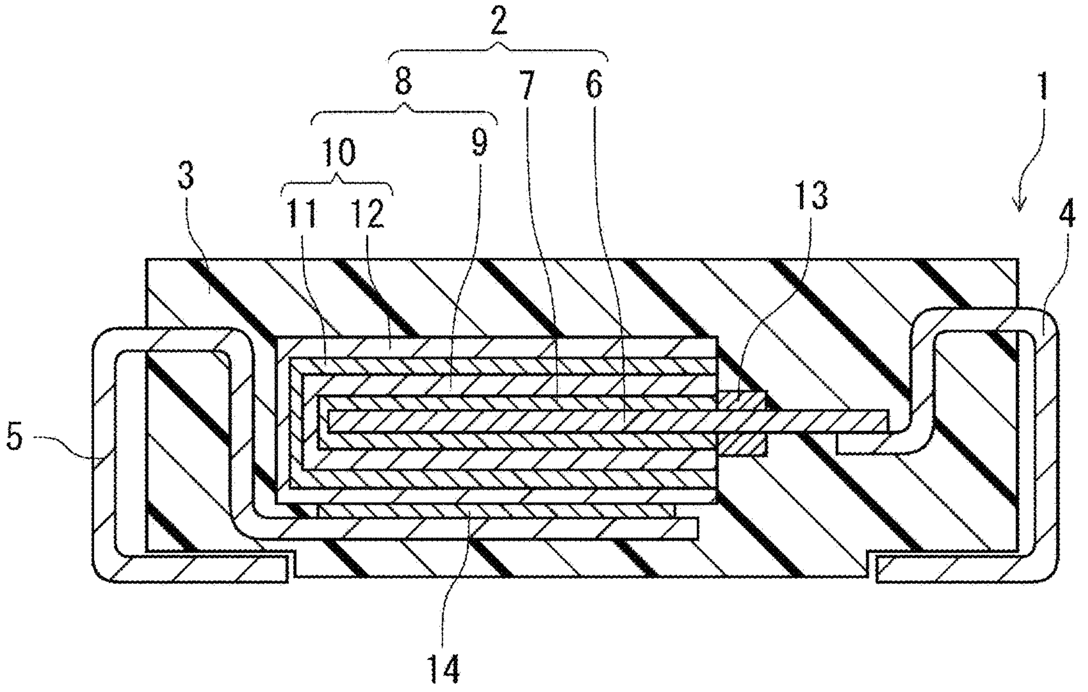
2
8
7
6
1
10
9
3
11
12
13
4
5
14

SOLID ELECTROLYTIC CAPACITOR ELEMENT AND SOLID ELECTROLYTIC CAPACITOR

CROSS REFERENCE TO RELATED APPLICATIONS

This Application is the National Stage of International Application No. PCT/JP2022/039565, filed on Oct. 24, 2022, which claims priority from Application No. 2021-208614 filed on Dec. 22, 2021 in Japan. The entire contents of these applications are incorporated herein by reference in their entirety.

TECHNICAL FIELD

The present disclosure relates to a solid electrolytic capacitor element and a solid electrolytic capacitor.

BACKGROUND ART

A solid electrolytic capacitor includes a solid electrolytic capacitor element, an exterior body that seals the solid electrolytic capacitor element, and an external electrode that is electrically connected to the solid electrolytic capacitor element. The solid electrolytic capacitor element includes an anode body, a dielectric layer that is formed on the surface of the anode body, and a cathode part that covers at least a portion of the dielectric layer. The cathode part includes, for example, a solid electrolyte layer that contains a conductive polymer covering at least a portion of the dielectric layer and a cathode extraction layer covering at least a portion of the solid electrolyte layer. The cathode extraction layer includes, for example, a carbon layer that covers at least a portion of the solid electrolyte layer and a metallic particle-containing layer that covers at least a portion of the carbon layer. The cathode extraction layer is electrically connected to the external electrode on the cathode side via a cathode lead.

As described in the prior art section of Patent Literature 1, a metallic particle-containing layer is often formed using a silver paste containing silver powder and a binder resin, from the viewpoint of obtaining high conductivity. However, this is disadvantageous in that silver powder is expensive and results in a high cost. Thus, Patent Literature 1 discloses that a solid electrolytic capacitor is configured such that the cathode conductive layer contains a conductive layer made of an organic filler coated with at least one kind of metal or conductive metallic oxide and a binder resin. According to Patent Literature 1, as the conductor layer, a copper paste layer is formed using a conductive filler obtained by forming a copper plating layer on the surface of acrylic resin powder and a nickel/tin paste layer is formed using a conductive filler obtained by forming a nickel plating layer and a tin plating layer on the surface of epoxy resin powder.

CITATION LIST

Patent Literature

PTL 1: Japanese Laid-Open Patent Publication No. H3-9508 (the prior art, the claims, and examples)

SUMMARY OF INVENTION

Technical Problem

As in Patent Literature 1, it is possible to achieve cost reduction by using a conductive filler obtained by coating the surface of resin powder with copper or nickel and tin as the metallic particle-containing layer of the cathode part. However, the resistance of the metallic particle-containing layer becomes high from an early stage, and thus it is difficult to suppress the equivalent series resistance (ESR) of the solid electrolytic capacitor to a low level. There is demand for a solid electrolytic capacitor element including a metallic particle-containing layer that achieves cost reduction while ensuring an initial low ESR value that is equivalent to that in the case of adopting a conventional silver paste layer containing silver particles.

Solution to Problem

A first aspect of the present disclosure relates to a solid electrolytic capacitor element including an anode body, a dielectric layer that is formed on the surface of the anode body, and a cathode part that covers at least a portion of the dielectric layer,

- wherein the cathode part includes a solid electrolyte layer that covers at least a portion of the dielectric layer, and includes a metallic particle-containing layer that contains metallic particles and a cured resin binder in at least a portion of the cathode part,
- the metallic particles include first metallic particles each containing silver and second metallic particles each containing silver,
- the first metallic particles each includes a core and a silver-containing coating layer that coats the core, and
- each of the second metallic particles is at least one selected from the group consisting of a silver particle and a silver alloy particle.

A second aspect of the present disclosure relates to a solid electrolytic capacitor that includes at least one above-described solid electrolytic capacitor element and an exterior body that seals the solid electrolytic capacitor element.

Advantageous Effects of Invention

It is possible to reduce the manufacturing cost of the solid electrolytic capacitor and suppress the initial ESR to a low level.

BRIEF DESCRIPTION OF DRAWING

A schematic cross-sectional view of a solid electrolytic capacitor according to an embodiment of the present disclosure.

DESCRIPTION OF EMBODIMENTS

While novel features of the present invention are set forth in the appended claims, both the configuration and content of the present invention, as well as other objects and features of the present invention, will be better understood from the following detailed description given with reference to the drawings.

In a solid electrolytic capacitor, metallic particles used in a metallic particle-containing layer constituting a portion of the cathode part are required to have high conductivity. The content of the metallic particles in the metallic particle-containing layer is relatively high (for example, 80 mass % or more). Thus, instead of using silver particles, using copper particles or nickel particles as the highly-conductive metallic particles would achieve a significant cost reduction. However, in comparison with silver particles, copper particles or nickel particles are low in material conductivity and are prone to oxidation deterioration, which makes it difficult to ensure high conductivity of the metallic particle-containing layer. Accordingly, when using copper particles or nickel particles, the resistance of the metallic particle-containing layer becomes high from an early stage and the ESR of the solid electrolytic capacitor increases, in comparison with a conventional silver paste layer that is obtained using a silver paste containing silver particles. Since the filler described in Patent Literature 1 has the surface coated with copper or nickel and tin, the filler is prone to oxidation deterioration, like copper particles or nickel particles as described above, and the conductivity becomes lower than that with silver particles, and the initial ESR increases.

In addition, copper particles or nickel particles are prone to progressive deterioration in high-humidity environments (in particular, in environments at relatively high temperatures and high humidities). Thus, if the solid electrolytic capacitor is exposed to a high-humidity environment, the particles will suffer deterioration and the metallic particle-containing layer will become high in resistance, resulting in an increase in the ESR. As for the filler described in Patent Literature 1, similarly, if such a filler is used in the metallic particle-containing layer, the ESR of the solid electrolytic capacitor will increase when exposed to a high-humidity environment.

In view of this, (1) a solid electrolytic capacitor element according to a first aspect of the present disclosure includes an anode body, a dielectric layer that is formed on the surface of the anode body, and a cathode part that covers at least a portion of the dielectric layer. The cathode part includes a solid electrolyte layer that covers at least a portion of the dielectric layer, and includes a metallic particle-containing layer that contains metallic particles and a cured resin binder in at least a portion of the cathode part. The metallic particles include first metallic particles each containing silver and second metallic particles each containing silver. The first metallic particles each includes a core and a silver-containing coating layer that coats the core. Each of the second metallic particle is at least one selected from the group consisting of a silver particle and a silver alloy particle.

Thus, in the solid electrolytic capacitor element of the present disclosure, the coated particle (the first metallic particle described above) including the core and the silver-containing coating layer that coats the core and at least one kind of metallic particle (the second metallic particle described above) selected from the group consisting of the silver particle and the silver alloy particle are used as the metallic particles contained in the metallic particle-containing layer of the cathode part. Since the presence of the core of the first metallic particle can reduce the content of silver in the metallic particle-containing layer, it is possible to keep the cost low. In addition, since the metallic particle-containing layer contains the first metallic particles, the oxidation deterioration of the particle surface is suppressed, thereby achieving the high conductivity of the silver-containing coating layer. Further, the metallic particle-containing layer contains, in addition to the first metallic particles, the second metallic particles with high conductivity. This makes it possible to suppress the initial EST to a low level. In comparison to a conventional silver paste layer using silver particles, it is possible to obtain a low ESR value that is equivalent to that with a silver paste layer, while achieving a low cost.

In the present disclosure, since the metallic particle-containing layer constituting the cathode part contains the first metallic particles each including the silver-containing coating layer together with the second metallic particles, it is possible to suppress the ESR to a relatively low level even if the solid electrolytic capacitor is exposed to a high-humidity environment. In other words, it is possible to obtain excellent humidity resistance of the solid electrolytic capacitor. In the present disclosure, it is also possible to ensure high humidity resistance that is equivalent to that with a conventional silver paste layer containing silver particles.

Herein, the metallic particle-containing layer containing the first metallic particles and the second metallic particles is called a first metallic particle-containing layer in some cases. In addition, the solid electrolytic capacitor element is simply called a capacitor element in some cases.

The cathode part includes a solid electrolyte layer and a cathode extraction layer that covers at least a portion of the solid electrolyte layer, for example. If the cathode extraction layer and the cathode lead are connected via a conductive adhesive, the cathode part herein also includes a conductive adhesive layer (hereinafter, also called first conductive adhesive layer) that intervenes between the cathode extraction layer and the cathode lead. In the solid electrolytic capacitor including a plurality of capacitor elements, if the plurality of capacitor elements are fixed by a conductive adhesive, the cathode part (more specifically, the cathode part of any one of the capacitor elements) herein also includes a conductive adhesive layer (hereinafter, also called a second conductive adhesive layer) that fixes the adjacent capacitor elements.

The cathode part may include, for example, the first metallic particle-containing layer in at least a portion of at least one selected from the group consisting of the cathode extraction layer, the first conductive adhesive layer, and the second conductive adhesive layer. For example, the cathode extraction layer may include a first layer (also called carbon layer) that contains conductive carbon and covers at least a portion of the solid electrolyte layer and the first metallic particle-containing layer as a second layer that covers at least a portion of the first layer. The cathode part may include, other than the first metallic particle-containing layer, a metallic particle-containing layer (hereinafter, also called a second metallic particle-containing layer or third metallic particle-containing layer). For example, the cathode extraction layer may include the carbon layer as the first layer and the second metallic particle-containing layer as the second layer, and may include the first metallic particle-containing layer as the first conductive adhesive layer that is interposed between the second metallic particle-containing layer and the cathode lead. In addition, the solid electrolytic capacitor may include a laminated body in which the plurality of capacitor elements including the cathode extraction layer including the first layer and the second metallic particle-containing layer as the second layer are laminated with the first metallic particle-containing layer as the second conductive adhesive layer in between. In such a laminated body, the cathode extraction layer and the cathode lead of each capacitor element may be connected via, as the first conductive adhesive layer, the third metallic particle-containing layer or the first metallic particle-containing layer.

(2) In the above (1), the second metallic particles may include at least one kind selected from the group consisting of spherical particles and flaky particles.

(3) In the above (2), the second metallic particles may include the spherical particles and the flaky particles. The mass ratio of the spherical particles to the flaky particles (=the spherical particles/the flaky particles) may be 20/80 to 80/20.

(4) In any one of the above (1) to (3), the average of the proportion of the silver-containing coating layer in the first metallic particles may be 0.1 mass % or more and 50 mass % or less.

(5) In any one of the above (1) to (4), the proportion of the first metallic particles in all the metallic particles may be 10 mass % or more and 60 mass % or less.

(6) In any one of the above (1) to (5), the core may be constituted of an organic particle or an inorganic particle.

(7) The present disclosure also includes a solid electrolytic capacitor that includes the solid electrolytic capacitor element according to any one of the above (1) to (6) and an exterior body that seals the solid electrolytic capacitor element.

(8) In the above (7), the solid electrolytic capacitor may include a plurality of solid electrolytic capacitor elements that are laminated.

Hereinafter, the capacitor element and the solid electrolytic capacitor of the present disclosure will be specifically described, including the above features (1) to (8), with reference to the drawings as necessary. At least one of the above features (1) to (8) and at least one of elements described below may be combined together without technical contradiction.

[Solid Electrolytic Capacitor]

The solid electrolytic capacitor includes one or more capacitor elements.

(Capacitor Element)

(Anode Body)

The anode body included in the capacitor element may contain a valve metal, an alloy containing a valve metal, a compound containing a valve metal, and the like. The anode body may include one kind of these materials or may include two or more kinds of these materials in combination. Examples of the valve metal include aluminum, tantalum, niobium, and titanium.

The anode body has a porous part at least on the surface layer. With the porous part, the anode body has minute protruding and recessed shapes at least on the surface. The anode body with the porous part on the surface layer can be obtained by, for example, roughening the surface of a base material (sheet-like (for example, foil-like or plate-like) base material or the like) containing a valve metal. Roughening may be performed by etching or the like, for example. The anode body may be a formed body of particles containing a valve metal or its sintered body. Each of the formed body and the sintered body may entirely constitute the porous part. Each of the formed body and the sintered body may have a sheet-like shape or may have a rectangular parallelepiped shape, a cubic shape, or a shape similar thereto.

The anode body usually has an anode extraction part and a cathode formation part. The porous part may be formed at the cathode formation part or may be formed at the cathode formation part and the anode extraction part. The cathode part is usually formed at the cathode formation part of the anode body with a dielectric layer in between. The anode extraction part is used for electrical connection with an external electrode on the anode side, for example.

(Dielectric Layer)

The dielectric layer is formed to cover the surface of at least a portion of the anode body, for example. The dielectric layer is an insulating layer that functions as a dielectric body. The dielectric layer is formed by subjecting the valve metal on the surface of the anode body to anode oxidation through chemical conversion treatment or the like. Since the dielectric layer is formed on the porous surface of the anode body, the surface of the dielectric layer has minute protruding and recessed shapes as described above.

The dielectric layer contains an oxide of a valve metal. For example, when tantalum is used as the valve metal, the dielectric layer contains $Ta_2O_5$, and when aluminum is used as the valve metal, the dielectric layer contains $Al_2O_3$. The dielectric layer is not limited to these examples and may simply function as a dielectric body.

(Cathode Part)

The cathode part is formed to cover at least a portion of the dielectric layer formed on the surface of the anode body. Each layer constituting the cathode part can be formed by a known method in accordance with its layer constitution of the cathode part.

The cathode part includes a solid electrolyte layer that covers at least a portion of the dielectric layer and a cathode extraction layer that covers at least a portion of the solid electrolyte layer, for example. The cathode part may further include a first conductive adhesive layer that intervenes between the cathode extraction layer and the cathode lead. The cathode part may also further include a second conductive adhesive layer that fixes the adjacent capacitor elements.

As described above, the first metallic particle-containing layer may be included in at least a portion of at least one selected from the group consisting of the cathode extraction layer, the first conductive adhesive layer, and the second conductive adhesive layer. The influence of the cathode extraction layer near the solid electrolyte layer on the ESR after humidity-resistance testing is larger than those of the first conductive adhesive layer and the second conductive adhesive layer. In the present disclosure, if the cathode part includes the first metallic particle-containing layer in at least the cathode extraction layer, the effect of reducing the ESR after humidity-resistance testing can be more easily obtained.

Hereinafter, component elements of the cathode part will be described.

(Solid Electrolyte Layer)

The solid electrolyte layer is formed on the surface of the anode body to cover the dielectric layer with the dielectric layer in between. The solid electrolyte layer is not necessarily required to cover the entire dielectric layer (entire surface), and is formed to cover at least a portion of the dielectric layer. The solid electrolyte layer constitutes at least a portion of the cathode part in the solid electrolytic capacitor.

The solid electrolyte layer contains a conductive polymer. The conductive polymer includes, for example, a conjugated polymer and a dopant. The solid electrolyte layer may further contain an additive as necessary.

The conjugated polymer may be a known conjugated polymer used in a solid electrolytic capacitor, such as a x-conjugated polymer, for example. Examples of the conjugated polymer include polymers having a basic skeleton of polypyrrole, polythiophene, polyaniline, polyfuran, polyacetylene, polyphenylene, polyphenylene vinylene, polyacene, or polythiophene vinylene. Among them, polymers having a basic skeleton of polypyrrole, polythiophene, or polyaniline are preferable. The above polymer contains at least one kind of monomer unit constituting the basic skeleton. The monomer unit also includes a monomer unit having a substituent group. The above polymer includes a homopolymer and a copolymer of two or more kinds of monomers. For example, polythiophene may include poly(3,4-ethylenedioxythiophene) (PEDOT) and the like.

The solid electrolyte layer may contain one kind of a conjugated polymer or may contain a combination of two or more kinds of conjugated polymers.

The weight-average molecular weight (Mw) of the conjugated polymer is not limited in particular, and is 1,000 or more and 1,000,000 or less, for example.

The weight-average molecular weight (Mw) herein takes a polystyrene-equivalent value measured by gel permeation chromatography (GPC). The GPC measurement is generally performed using a polystyrene gel column and water/methanol (a volume ratio of 8/2) as a mobile phase.

Examples of the dopant include at least one selected from the group consisting of anion and polyanion.

Examples of the anion include, but are not limited to, sulfate ion, nitrate ion, phosphate ion, borate ion, an organic sulfonate ion, and carboxylate ion. Examples of the dopant that generates sulfonate ions include benzenesulfonic acid, p-toluenesulfonic acid, and a naphthalenesulfonic acid.

The polyanion may be a polymeric anion or the like, for example. The solid electrolyte layer may contain a conjugated polymer containing a monomer unit corresponding to a thiophene compound and a polymeric anion, for example.

The polymeric anion may be a polymer having a plurality of anionic groups, for example. Such a polymer may be a polymer including a monomer unit with an anionic group. Examples of the anionic group include sulphonic acid group, and carboxy group.

The anionic group of the dopant may be contained in the solid electrolyte layer in a free form, an anionic form, or a salt form, or may be contained in a form bound to or interacting with the conjugated polymer. Herein, the groups in all these forms will simply be called "anionic group", "sulphonic acid group", "carboxy group" or the like in some cases.

Examples of the polymeric anion having a carboxylic group include, but are not limited to, polyacrylic acid, polymethacrylic acid, or copolymers in which at least either of acrylic acid and methacrylic acid is used.

The polymeric anion having a sulfonic acid group may be a polymer-type polysulfonic acid, for example. Specific examples of the polymer-type polysulfonic acid include, but are not limited to, a polyvinyl sulfonic acid, a polystyrene sulfonic acid (including a copolymer and a substitute having a substituent group), a polyallylsulfonic acid, a polyacrylsulfonic acid, a polymethacrylsulfonic acid, a poly(2-acrylamido-2-methylpropanesulfonic acid), a polyisoprenesulfonic acid, a polyestersulfonic acid (such as an aromatic polyestersulfonic acid), and a phenolsulfonic acid novolac resin.

The content of the dopant in the solid electrolyte layer is 10 to 1000 parts by mass, for example, and may be 20 to 500 parts by mass or 50 to 200 parts by mass, with respect to 100 parts by mass of the conjugated polymer.

The solid electrolyte layer may further contain, as necessary, at least one selected from the group consisting of known additives and known conductive materials other than the conductive polymers. Examples of the conductive materials include at least one selected from the group consisting of conductive inorganic materials such as manganese dioxide and TCNQ complex salts.

A layer for enhancing adhesion may be interposed between the dielectric layer and the solid electrolyte layer.

The solid electrolyte layer may be a single layer or may be constituted of multiple layers. For example, the solid electrolyte layer may include a first solid electrolyte layer that covers at least a portion of the dielectric layer and a second solid electrolyte layer that covers at least a portion of the first solid electrolyte layer. The kinds, compositions, and contents of the conjugated polymer, dopant, and additives contained in these layers may be different or the same between the layers.

The solid electrolyte layer is formed by polymerizing a precursor of the conjugated polymer on the dielectric layer using a processing liquid containing the precursor and the dopant, for example. The polymerization can be performed by at least either of chemical polymerization and electrolytic polymerization. Examples of the precursor of the conjugated polymer may include a monomer, an oligomer, and a prepolymer. The solid electrolyte layer may be formed by applying a processing liquid containing a conductive polymer (for example, a dispersion liquid or a solution) to the dielectric layer and then drying the applied liquid. The dispersion medium (or solvent) may be at least one selected from the group consisting of water and organic solvents, for example. The processing liquid may further contain another component (at least one selected from the group consisting of dopants and additives). For example, the solid electrolyte layer may be formed using a processing liquid containing a conductive polymer (for example, PEDOT), a dopant (for example, a polyanion such as a polystyrene sulfonic acid), and, as necessary, an additive.

When using a processing liquid containing a precursor of a conjugated polymer, an oxidant is used to polymerize the precursor. The oxidant may be contained as an additive in the processing liquid. The oxidant may be applied to the anode body before or after the processing liquid is brought into contact with the anode body on which the dielectric layer is formed. Examples of the oxidant include compounds capable of generating $Fe^{3+}$ (such as ferric sulfate), persulfates (such as sodium persulfate and ammonium persulfate), and hydrogen peroxide. The oxidant may be of one kind or two or more kinds in combination.

The step of forming the solid electrolyte layer by immersion in the processing liquid and polymerization (or drying) may be performed once or may be repeated more than once. In the iterations of the step, conditions such as the composition and viscosity of the processing liquid may be the same or at least one condition may be made different.

(Cathode Extraction Layer)

The cathode extraction layer includes at least a first layer that contacts the solid electrolyte layer and covers at least a portion of the solid electrolyte layer, and may include the first layer and a second layer that covers at least a portion of the first layer.

The first layer may be a layer containing conductive particles, metallic foil, or the like, for example. Examples of the conductive particles may include at least one selected from conductive carbon and metallic powder. The cathode extraction layer may be constituted of, for example, a layer containing conductive carbon (carbon layer) as the first layer, and a layer containing metallic powder or metallic foil as the second layer. In the case of using metallic foil as the first layer, the cathode extraction layer may be constituted of the metallic foil.

Examples of the conductive carbon may include graphite (artificial graphite, natural graphite, or the like).

The layer containing metallic powder as the second layer can be formed by laminating a composition containing metallic powder on the surface of the first layer, for example. The second layer may be a metallic paste layer formed using a paste containing metallic powder and a resin (binder resin), for example. The binder resin may be a thermoplastic resin but is preferably a thermosetting resin such as an imide-based resin or an epoxy resin. From the viewpoint of easily obtaining high conductivity of the second layer, the metallic powder may be silver-containing particles. Examples of the silver-containing particles may include silver particles, silver alloy particles, the first metallic particles, or the like. The second layer may contain one kind of silver-containing particles or may contain two or more kinds of silver-containing particles in combination. From the viewpoint of ensuring higher conductivity of the second layer, each of the silver-containing particles is preferably a silver particle or a first metallic particle. The silver particle may contain a small amount of impurities. The second layer containing the silver-containing particles may be a first metallic particle-containing layer or a second metallic particle-containing layer. The second layer may contain silver particles and silver alloy particles, may contain the first metallic particles, or may contain the first metallic particles and at least either silver particles and silver alloy particles, for example.

In using metallic foil as the first layer, the kind of metal is not limited in particular. The metallic foil preferably contains a valve metal (such as aluminum, tantalum, or niobium), or an alloy containing a valve metal. As necessary, the surface of the metallic foil may be roughened. The surface of the metallic foil may be provided with a chemical conversion film, or may be provided with a coating film of a metal different from the metal constituting the metallic foil (different metal) or a non-metal coating film. The different metal or non-metal may be a metal such as titanium or a non-metal such as carbon (such as conductive carbon).

The above coating film of the different metal or non-metal (for example, conductive carbon) may be used as the first layer, and the above-described metallic foil may be used as the second layer.

If the cathode extraction layer includes the first metallic particle-containing layer, the entire cathode extraction layer may be constituted of the first metallic particle-containing layer, the first layer may be constituted of the first metallic particle-containing layer, or the second layer may be constituted of the first metallic particle-containing layer. For example, the cathode extraction layer may include the first layer that contains conductive carbon (carbon layer) and the second layer that includes the first metallic particle-containing layer covering at least a portion of the first layer.

The cathode extraction layer is formed by a known method in accordance with its layer configuration. For example, if the cathode extraction layer contains metallic foil as the first layer or the second layer, the first layer or the second layer is formed by laminating the metallic foil so as to cover at least a portion of the solid electrolyte layer or the first layer. The first layer containing conductive particles is formed by applying a conductive paste or a liquid dispersion containing conductive particles and a resin binder (such as a water-soluble resin or a curable resin) as necessary to the surface of the solid electrolyte layer, for example. The second layer containing metallic powder is formed by applying a paste containing metallic powder and a resin binder to the surface of the first layer, for example. In the course of the formation of the cathode extraction layer, a drying process, a heating process, and the like may be performed as necessary.

(First Conductive Adhesive Layer)

The solid electrolytic capacitor may include a cathode lead. In the solid electrolytic capacitor, the cathode lead is connected to the cathode extraction layer via the first conductive adhesive layer. If the solid electrolytic capacitor includes a plurality of capacitor elements, the cathode extraction layers of one or some of the capacitor elements and the cathode lead may be connected via the first conductive adhesive layer. The cathode extraction layer of the capacitor element and the cathode lead are electrically connected with the first conductive adhesive layer.

The first conductive adhesive layer may be formed by using a known conductive adhesive. The known conductive adhesive may be a paste containing conductive particles and a resin binder (such as a curable resin), for example. The first conductive adhesive layer formed using a known conductive adhesive may be a second metallic particle-containing layer formed using a known silver-containing adhesive (for example, a silver-containing paste). The first conductive adhesive layer is formed by arranging the above paste (including a silver-containing paste) to be sandwiched between the cathode extraction layer and the cathode lead. For example, the above paste may be applied or transferred to a portion of the surface of the cathode extraction layer, and one end portion of the cathode lead may be overlaid on the formed coating film of the paste. In the course of the formation of the first conductive adhesive layer, a drying process, a heating process, and the like may be performed as necessary.

The first conductive adhesive layer may be the first metallic particle-containing layer. In this case, the cathode part includes the first metallic particle-containing layer that intervenes between the cathode extraction layer and the cathode lead.

(Second Conductive Adhesive Layer)

If the solid electrolytic capacitor includes a plurality of capacitor elements, the plurality of capacitor elements may be fixed via the second conductive adhesive layer. For example, if the solid electrolytic capacitor includes a laminated body of a plurality of capacitor elements, the plurality of capacitor elements may be laminated with the second conductive adhesive layer in between. The second conductive adhesive layer may be in contact with the cathode extraction layer of each capacitor element. The second conductive adhesive layer allows the plurality of capacitor elements to be electrically connected.

The second conductive adhesive layer may be formed using a known conductive adhesive. The known conductive adhesive may be a paste containing conductive particles and a resin binder (such as a curable resin), for example. The second conductive adhesive layer formed using a known conductive adhesive may be a third metallic particle-containing layer that is formed using a known silver-containing adhesive (for example, a silver-containing paste). Such a second conductive adhesive layer is formed by, for example, arranging the above paste (including a silver-containing paste) so as to be sandwiched between the adjacent capacitor elements. For example, the above paste may be applied or transferred to a portion of the surface of the cathode extraction layer of one capacitor element, and another capacitor element may be overlaid on the formed coating film of the paste. In the course of the formation of the second conductive adhesive layer, a drying process, a heating process, and the like may be performed as necessary.

The second conductive adhesive layer may be the first metallic particle-containing layer. In this case, the adjacent solid electrolytic capacitors are fixed via the first metallic particle-containing layer.

The first metallic particle-containing layer included in the cathode part will be described below in detail.

(First Metallic Particle-Containing Layer)

The first metallic particle-containing layer contains metallic particles and a cured resin binder. The metallic particles include first metallic particles each containing silver and second metallic particles each containing silver. The first metallic particles each include a silver-containing coating layer. Each of the second metallic particles is specifically at least one selected from the group consisting of a silver particle and a silver alloy particle.

(First Metallic Particles)

The first metallic particles each include a core and a silver-containing coating layer that coats the core. The core is constituted of an organic particle or an inorganic particle, for example. The organic particle may be a resin particle or the like. There is no particular limit on the kind of the resin, and the resin may be a thermoplastic resin or a composition thereof, a curable resin or a composition thereof, or the like. The inorganic particle may be a metallic particle or metallic alloy particle that contains a metal other than silver, a particle of a metallic compound (a particle of a conductive metallic compound such as a ceramic particle), a carbon particle, or the like. The core may be conductive or insulative. The core is preferably constituted of a conductive material from the viewpoint of obtaining higher conductivity of the first metallic particle-containing layer. However, the core is constituted of a material less expensive than silver such that the core achieves low cost. Examples of the conductive material for the core include copper, nickel, iron, aluminum, tin, or an alloy containing these metals, and conductive carbon particles. The conductive carbon particles may be made of graphite, for example. The core is preferably constituted of copper, copper alloy, nickel, nickel alloy, or the like, from the viewpoint of easily ensuring high conductivity. The single metallic component constituting the core such as copper or nickel may contain a small amount of impurities.

The silver-containing coating layer may be constituted of silver or may be constituted of a silver alloy. From the viewpoint of obtaining high conductivity, the silver-containing coating layer is preferably constituted of silver. In this case, the silver may contain a small amount of impurities.

The average of the proportion of the silver-containing coating layer in the first metallic particles may be 0.1 mass % or more and 50 mass % or less, may be 1 mass % or more and 40 mass % or less, may be 5 mass % or more and 30 mass % or less, or may be 10 mass % or more and 30 mass % or less, for example. If the proportion of the silver-containing coating layer is within such ranges, the surface of each of the cores is mostly coated with the silver-containing coating layer, and therefore the high conductivity of the first metallic particles can be easily ensured, and the deterioration of the core can be easily reduced. This makes it easy to ensure the high conductivity of the first metallic particle-containing layer. This enhances the effect of suppressing the initial ESR to a low level while ensuring the effect of cost reduction.

The first metallic particles may include one kind of particles or may include a combination of two or more kinds of particles that differ in the composition of at least one of the core and the silver-containing coating layer.

The shape of the first metallic particles is not limited in particular and may be a spherical shape (including an oval shape and the like), a flaky shape, an indefinite shape, or the like. The first metallic particles may include particles of one shape or may include a combination of particles of two or more shapes. The first metallic particles preferably include at least spherical particles, from the viewpoint of easily providing a large number of contact points between the particles and ensuring high conductivity. In this case, the effect of suppressing the initial ESR to a low level tends to be enhanced. The first metallic particles may include spherical particles and flaky particles, for example.

The spherical particles herein refer to particles with a sphericity of 0.7 or more and 1 or less. The flaky particles herein refer to flat-shaped or flake-shaped particles.

The sphericity of the particles herein can be estimated by acquiring a cross section image of a plurality of particles (for example, 10 or more particles) and analyzing the outlines of the particles in the image. The ratio of the diameter of a circle equivalent to the area of a closed curve formed by each outline (hereinafter called an "equivalent circle") to the diameter of the smallest circle circumscribing the outline is determined. The average of the ratios of the plurality of particles is set as the sphericity of the particles. For example, if spherical particles and particles of another shape are included, a plurality of particles are selected from the spherical particles to determine the sphericity according to the above-described procedure. The cross section image may be an image obtained by a scanning electron microscope (SEM).

The cross section image is obtained according to the procedure described below, for example. First, a solid electrolytic capacitor is embedded in a curable resin, and the curable resin is cured. The cured product is subjected to wet sanding or dry sanding, thereby to expose the cross section of the cathode part parallel to the thickness direction (the cross section where the laminated state of the layers in the cathode part can be checked). The exposed cross section is smoothed out by ion milling to obtain a sample for imaging. As necessary, the cross section image may be analyzed by image-analysis particle size distribution measurement software (for example, MAC-View (Mountech Co., Ltd.)) to determine the outlines of the particles.

The average particle size of the first metallic particles may be 1 μm or more and 20 μm or less, and may be 1 μm or more and 10 μm or less, for example. If the average particle size is within such ranges, the effect of suppressing the initial ESR to a low level is enhanced.

The average particle size of the particles herein can be estimated by acquiring a cross section image of a plurality of particles (for example, 10 or more particles) and analyzing the outlines of the particles in the images. The average particle size is obtained by determining and averaging the diameter of an equivalent circle that is equivalent to the area within a closed curve formed by each outline. The production of a sample for a cross section image and the analysis of the image are performed according to a procedure similar to that for determining the sphericity, for example. As necessary, the cross section image may be analyzed using the above-described software to determine the outline of each particle and determine the diameter of the equivalent circle with the same area as the area surrounded by the outline or the diameter of the smallest circumscribing circle.

The proportion of the first metallic particles in all of the metallic particles contained in the first metallic particle-containing layer may be 10 mass % or more and 90 mass % or less, or may be 20 mass % or more and 80 mass % or less, for example. From the viewpoint of enhancing the effect of suppressing the initial ESR to a low level, the proportion of the first metallic particles is preferably 10 mass % or more and 60 mass % or less, and may be 20 mass % or more and 50 mass % or less. If the proportion of the first metallic particles is within such ranges, the increase of the ESR after exposure to a high-humidity environment can also be suppressed.

(Second Metallic Particles)

Among the above-described second metallic particles, silver particles are preferable. The silver particles may contain a small amount of impurities. Each of the second metallic particles may include a silver particle and a silver alloy particle. The content of the silver particles in the second metallic particles is 80 mass % or more, for example, and may be 90 mass % or more. The content of the silver particles in the second metallic particles is 100 mass % or less. The second metallic particles may be constituted of only silver particles.

The shape of each of the second metallic particles is not limited in particular and may be a spherical shape (including an oval shape and the like), a flaky shape, an indefinite shape, or the like. The second metallic particles may include particles of one shape or may include a combination of particles of two or more shapes. For example, the second metallic particles may include at least one selected from the group consisting of spherical particles and flaky particles. The second metallic particles preferably include at least spherical particles from the viewpoint of easily providing a large number of contact points between the particles and ensuring high conductivity. In this case, the effect of suppressing the initial ESR to a low level tends to be enhanced.

The second metallic particles may include spherical particles (also called metallic particles 2A) and flaky particles (also called metallic particles 2B), for example. In the first metallic particle-containing layer, adjusting the mass ratio between the metallic particles 2A and the metallic particles 2B makes it possible to suppress both the initial ESR and the ESR after the solid electrolytic capacitor is exposed to a humidity-resistance environment, even if the first metallic particle-containing layer contains the first metallic particles that are likely to cause a problem of resistance increase or deterioration as compared to the second metallic particles.

The mass ratio of the spherical particles (the metallic particles 2A) to the flaky particles (the metallic particles 2B) (=the metallic particles 2A/the metallic particles 2B) may be 20/80 to 100/0. This enhances the effect of suppressing the initial ESR to a low level. The metallic particles 2A/the metallic particles 2B (mass ratio) may be 20/80 to 80/20, may be 20/80 to 75/25, or may be 25/75 to 75/25. This makes it possible to suppress the increase in the ESR of the solid electrolytic capacitor after exposure to a humidity-resistance environment while suppressing the initial ESR to a low level, thereby achieving an excellent balance between the two. The presence of the metallic particles 2B makes it easy to adjust the filling rate of the metallic particles in the first metallic particle-containing layer and place the resin binder around the first metallic particles. Therefore, if the second metallic particles contain the metallic particles 2B to some degree as in the case with a mass ratio within the above-described ranges, it is conceivable that the deterioration of the first metallic particles exposed to a high-humidity environment can be suppressed to enhance the effect of suppressing the ESR to a low level.

The average particle size of the second metallic particles is 0.01 μm or more and 50 μm or less, for example, and may be 0.1 μm or more and 20 μm or less. The average particle size of the metallic particles 2A is 0.01 μm or more and 10 μm or less, for example, and may be 0.1 μm or more and 5 μm or less. The average particle size of the metallic particles 2B is 0.2 μm or more and 50 μm or less, for example, and may be 0.5 μm or more and 20 μm or less.

The sphericity and average particle size of the second metallic particles are determined in accordance with the case of the first metallic particles.

(Third Metallic Particles)

The first metallic particle-containing layer may contain third metallic particles other than the first metallic particles and the second metallic particles. The third metallic particles may be metallic particles that do not substantially contain a precious metal such as silver or gold, for example. Examples of the third metallic particles include copper particles, copper alloy particles, nickel particles, and nickel alloy particles. Metallic particles containing a precious metal as an impurity are included in the third metallic particles.

If the first metallic particle-containing layer contains the third metallic particles, it is advantageous in terms of cost reduction. However, the first metallic particle-containing layer is prone to progressive oxidation deterioration or deterioration in high-humidity environments. Therefore, the content of the third metallic particles in all of the metallic particles contained in the first metallic particle-containing layer is preferably low from the viewpoint of suppressing the initial ESR or the ESR after exposure to a high-humidity environment to a low level. The total sum of the contents of the first metallic particles and the second metallic particles in all the metallic particles is 90 mass % or more, for example, and may be 95 mass % or more. The total of the contents of the first metallic particles and the second metallic particles in all the metallic particles is 100 mass % or less. The metallic particles may be constituted of only the first metallic particles and the second metallic particles.

(Cured Resin Binder)

The first metallic particle-containing layer is formed using, for example, a paste containing metallic particles and a resin binder. For example, the coating film of the conductive paste is heated to cure the resin binder, thereby forming the first metallic particle-containing layer.

Examples of the resin binders may include a curable resin material. The curable resin material may be a resin composition that contains a curable resin (for example, a thermoset resin), a component involved in curing of the curable resin, and at least one selected from the group consisting of an additive and a liquid medium as necessary. The component involved in curing of the curable resin may be a polymerization initiator, a curing agent, a curing accelerator, a cross-linking agent, and a curing catalyst, for example, in accordance with the type of the curable resin. One kind of these components may be used or two or more kinds of the components may be used in combination. The additive may be a known additive used in a conductive paste of a solid electrolytic capacitor, for example.

The curable resin is preferably an epoxy resin, a polyamide imide resin, a polyimide resin, a phenol resin, or the like. The resin binder may contain one kind of curable resin or may contain two or more kinds of curable resins in combination.

In the first metallic particle-containing layer, the amount of the cured resin binder may be 2 parts by mass or more and 25 parts by mass or less, may be 4 parts by mass or more and 18 parts by mass or less, or may be 4 parts by mass or more and 10 parts by mass or less, for example, with respect to 100 parts by mass of the metallic particles. However, the amount of the cured resin binder is not limited to these ranges.

(Others)

The content of the metallic particles in the first metallic particle-containing layer is determined in consideration of the balance between the conductivity and the adhesion, for example. The content of the metallic particles may be 80 mass % or more and 98 mass % or less, or may be 85 mass % or more and 96 mass % or less, for example. However, the proportion of the metallic particles is not limited to these ranges.

The thickness of the first metallic particle-containing layer is 0.5 μm or more and 100 μm or less, for example, and may be 1 μm or more and 50 μm or less, or may be 1 μm or more and 20 μm or less.

The thickness of the first metallic particle-containing layer is determined by measuring the thickness of the first metallic particle-containing layer at a plurality of points (for example, 10 points) in a cross section image, and averaging the measurement values.

The thickness of the first metallic particle-containing layer is measured using a cross section image of a portion of the capacitor element including the first metallic particle-containing layer obtained by an SEM, for example. The cross section image is produced according to the same procedure as that for determining the sphericity, for example.

The first metallic particle-containing layer can be formed by applying a conductive paste containing at least the first metallic particles, the second metallic particles, and a resin binder to at least one member (also called constituent member) constituting the capacitor element (more specifically, the cathode part) so as to cover at least a portion of the member, and subjecting the same to a heating process. The constituent member to which the conductive paste is applied may be layers in the cathode part that are to come into contact with the first metallic particle-containing layer, such as the solid electrolyte layer, the cathode extraction layer, the first layer or the second layer constituting the cathode extraction layer, and the cathode lead.

The conductive paste can be obtained by mixing together constituent components. The mixing can be performed by adopting a known method. The liquid medium used in the preparation of the conductive paste is a medium in a liquid form at a temperature at which the conductive paste is to be prepared or applied, and may be a medium in a liquid form at room temperatures (for example, 20° C. to 35° C.). The liquid medium may be an organic solvent, for example. As the liquid medium, an organic solvent and water may be used in combination. The liquid medium is selected in accordance with the kinds of the curable resin, components involved in curing, additives, and the like.

(Others)

The solid electrolytic capacitor may be a winding type, or may be either a chip type or a laminated type. If the solid electrolytic capacitor includes a plurality of capacitor elements, each capacitor element may be a winding type or a laminated type, for example. A laminated-type solid electrolytic capacitor includes, for example, a plurality of laminated capacitor elements. The configuration of the capacitor elements can be selected in accordance with the type of the solid electrolytic capacitor.

In the capacitor element, one end portion of the cathode lead is electrically connected to the cathode extraction layer, for example. One end portion of the anode lead is electrically connected to the anode body (specifically, the anode extraction part), for example. The other end portion of the anode lead and the other end portion of the cathode lead are drawn out from the exterior body. The other end portions of the leads exposed from the exterior body are used for solder connection with a substrate to be equipped with the solid electrolytic capacitor or the like, and are electrically connected to an external electrode. At least a portion of the external electrode constitutes the external terminal of the solid electrolytic capacitor. The leads may be lead wires or may be lead frames. The leads need not be used and the end surface of the anode extraction part may be exposed from the exterior body and connected to the external electrode. Cathode foil may be connected to the cathode extraction layer and the end surface of the cathode foil may be exposed from the exterior body and connected to the external electrode. The end surface of the other end portion of the lead connected to the cathode extraction layer may be exposed from the exterior body and connected to the external electrode.

The capacitor element is sealed with, for example the exterior body. For example, the capacitor element and the material resins of the exterior body (for example, an uncured curable resin and a filler) may be put in a molding die to seal the capacitor element with the resin exterior body by transfer molding, compression molding, or the like. At this time, the other end portion of the anode lead and the other end portion of the cathode lead, which are drawn out from the capacitor element, are exposed from the metallic die. Alternatively, the solid electrolytic capacitor may be molded by putting the capacitor element in a bottomed case such that the other end portion of the anode lead and the other end portion of the cathode lead are positioned at the opening side of the bottomed case, and then sealing the opening in the bottomed case with the sealing body.

FIG. 1 is a schematic cross-sectional view of a structure of a solid electrolytic capacitor according to an embodiment of the present disclosure. As illustrated in FIG. 1, a solid electrolytic capacitor 1 includes a capacitor element 2, a resin exterior body 3 that seals the capacitor element 2, and an anode terminal 4 and a cathode terminal 5 that are at least partially exposed to the outside of the resin exterior body 3. The anode terminal 4 and the cathode terminal 5 can be constituted of a metal such as copper or copper alloy, for example. The resin exterior body 3 has at least a rectangular parallelepiped outer shape, and the solid electrolytic capacitor 1 also has at least a rectangular parallelepiped outer shape.

The capacitor element 2 includes an anode body 6, a dielectric layer 7 that covers the anode body 6, and a cathode part 8 that covers the dielectric layer 7. The cathode part 8 includes a solid electrolyte layer 9 that covers the dielectric layer 7 and a cathode extraction layer 10 that covers the solid electrolyte layer 9. The cathode extraction layer 10 includes a first layer 11 that covers the solid electrolyte layer 9 and a second layer 12 that covers the first layer.

The anode body 6 includes a region that faces the cathode part 8 and a region that does not face the cathode part 8. In the region of the anode body 6 not facing the cathode part 8, a part adjacent to the cathode part 8 has an insulating separation part 13 so as to cover the surface of the anode body 6 in a belt shape, thereby restricting contact between the cathode part 8 and the anode body 6. In the region of the anode body 6 not facing the cathode part 8, another part is electrically connected to the anode terminal 4 by welding. The cathode terminal 5 is electrically connected to the cathode part 8 via a first conductive adhesive layer 14.

In the illustrated example, at least one of the second layer 12 and the first conductive adhesive layer 14 (preferably, at least the second layer 12) may be the first metallic particle-containing layer that contains the first metallic particles and the second metallic particles. As above, if the cathode part includes the first metallic particle-containing layer, it is possible to suppress the initial ESR to a low level while keeping the cost low. It is also possible to ensure a low ESR value that is equivalent to that with a conventional silver paste layer. Further, it is possible to suppress the ESR of the solid electrolytic capacitor exposed to a high-humidity environment to a low level, and ensure a low ESR value that is equivalent to or close to that with a conventional silver paste layer.

Hereinafter, the present invention will be specifically described with reference to examples and reference examples. However, the present invention is not limited to the following examples.

Example 1 and Reference Example 1

Capacitor elements were produced and evaluated according to the procedures described below.

(1) Preparation of Anode Body

An anode body was prepared by etching and roughening both surfaces of aluminum foil (thickness: 100 μm) serving as a base material.

(2) Formation of Dielectric Layer

The other end part of the anode body was immersed in a chemical conversion liquid, and was placed under a 2.5-V direct-current voltage for 20 minutes to form a dielectric layer containing aluminum oxide.

(3) Formation of Solid Electrolyte Layer

An aqueous solution containing pyrrol monomer and p-toluenesulfonic acid was prepared. The concentration of the monomer in the aqueous solution was 0.5 mol/L, and the concentration of p-toluenesulfonic acid was 0.3 mol/L.

The anode with the dielectric layer formed in step (2) and a counter electrode were immersed in the obtained aqueous solution, and were subjected to electrolytic polymerization at 25° C. under a polymerization voltage of 3 V (polymerization potential to a silver reference electrode), thereby forming a solid electrolyte layer.

(4) Formation of Cathode Part

The anode body obtained in step (3) was immersed in a dispersion liquid obtained by dispersing graphite particles in water, and then was taken out of the dispersion liquid and dried, thereby forming a first layer (carbon layer) at least on the surface of the solid electrolyte layer. The drying was conducted at 150° C. for 30 minutes.

Then, a conductive paste containing metallic particles shown in the table was applied to the surface of the first layer, and was subjected to a heating process at 210° C. for 10 minutes, thereby forming a second layer that is a metallic particle-containing layer. In this manner, the cathode extraction layer constituted of the first layer and the second layer was formed. The thickness of the second layer was about 10 μm. In the above-described manner, a total of 40 capacitor elements were produced.

The conductive paste used for the formation of the second layer was prepared by mixing the metallic particles shown in the table, a resin binder, and a liquid medium (or a dispersion liquid or a solution containing a resin binder). As the resin binder, an epoxy resin composition was used. The content of the metallic particles in the total amount of the components other than the liquid medium in the conductive paste was 93.5 mass %. The proportion of the resin binder to the total 100 parts by mass of the metallic particles was 7 parts by mass. The metallic particles shown in the table were as follows:

- (a) First metallic particles: silver-coated particles each including a core particle made of copper and a silver coating layer coating the core particle (with a silver coat ratio of 20 mass %, an average particle size of 4.1 μm, and a spherical shape (sphericity: 0.9))
- (b) Second metallic particles: spherical silver particles (metallic particles 2A (with a sphericity of 0.9 and an average particle size of 0.5 μm)) and flaky silver particles (metallic particles 2B (with an average particle size of 2.0 μm)), and the metallic particles 2A/the metallic particles 2B (mass ratio)=50/50.

The sphericity of each type of particles is equivalent to the sphericity that is determined from a cross section image of the metallic particle-containing layer according to the procedure described above.

[Evaluations]

The capacitor elements were evaluated as described below.

(a) Initial ESR

The initial ESRs (mΩ) of the capacitor elements were measured at 20° C. at a frequency of 100 kHz, using an LCR meter for four-terminal measurement. Then, the average value of the initial ESRs of the 40 capacitor elements was determined. The initial ESR was represented in a value relative to 100 of the initial ESR in Reference Example 1.

(b) ESR after Humidity-Resistance Testing

The capacitor elements were subjected to humidity-resistance testing by being left to stand under no load for 500 hours in a high-temperature and high-humidity environment at 85° C. and 85% RH. The ESRs after humidity-resistance testing were measured at 20° C. according to the same procedure as that in the initial ESR in (a) described above, and the average value of the ESRs of the 40 capacitor elements was determined. The ESR after humidity-resistance testing was represented in a value relative to 100 of the ESR after humidity-resistance testing in Reference Example 1.

(c) Cost

The approximate cost of the metallic particles that were used in the metallic particle-containing layer in each capacitor element was determined and represented by a value relative to 100 of the cost in Reference Example 1 (where 100 mass % of silver particles was used for the first metallic particles).

Table 1 shows the evaluation results, where E1 indicates Example 1 and R1 indicates Reference Example 1.

TABLE 1

| | First metallic particles (mass %) | Second metallic particles (mass %) | Initial ESR (relative value) | ESR after humidity-resistance testing (relative value) | Cost (relative value) |
|---|---|---|---|---|---|
| R1 | 0 | 100 | 100 | 100 | 100 |
| E1 | 40 | 60 | 100 | 92 | 70 |

As shown in Table 1, in E1 using the first metallic particles, although the cores are copper particles, it is possible to ensure a low initial ESR value that is equivalent to that in R1 using only silver particles, while keeping the cost low. As for the ESR after humidity-resistance testing, in E1 using the first metallic particles, although the cores are copper particles, it is possible to ensure a low ESR value that is equivalent to or less than that in R1 using only silver particles.

Examples 2 to 4

In the formation of the second layer, the mass ratio between the metallic particles 2A and the metallic particles 2B in the second metallic particles was changed as shown in the table. A total of 40 capacitor elements were produced and evaluated in the same manner as in Example 1 except for the above.

Table 2 shows the evaluation results. In the table, E2 to E4 indicate Examples 2 to 4. Table 2 also shows the results of E1 and R1.

TABLE 2

| | First metallic particles (mass %) | Second metallic particles (mass %) | Second metallic particles: First metallic particles 2A/second metallic particles 2B (mass ratio) | Initial ESR (relative value) | ESR after humidity-resistance testing (relative value) | Cost (relative value) |
|---|---|---|---|---|---|---|
| R1 | 0 | 100 | 50/50 | 100 | 100 | 100 |
| E2 | 40 | 60 | 100/0 | 91 | 250 | 70 |
| E3 | | | 75/25 | 93 | 145 | 70 |
| E1 | | | 50/50 | 100 | 92 | 70 |
| E4 | | | 25/75 | 122 | 95 | 70 |

As shown in Table 2, in E2 to E4, like E1, the use of the first metallic particles reduces the cost as compared to R1. In addition, if the second metallic particles include the spherical metallic particles 2A, it is possible to suppress the initial ESRs to a relatively low level. On the other hand, if the second metallic particles include the flaky metallic particles 2B, it is possible to suppress the ESR after humidity-resistance testing to a relatively low level. In addition to the first metallic particles, using the spherical metallic particles 2A and the flaky metallic particles 2B in combination as the second metallic particles suppresses both the initial ESR and the ESR after humidity-resistance testing to a low level, and achieves an effect that is equivalent to that in R1 using only silver particles or an effect that is close to that in R1.

Although the present invention has been described using embodiments that are preferred at the present time, such disclosure is not intended to be construed as limiting. Various changes and modifications will no doubt become apparent to those skilled in the art to which the present invention pertains upon reading the above disclosure. It is, therefore, intended that the appended claims be construed as covering all changes and modifications without departing from the true spirit and scope of the present invention.

INDUSTRIAL APPLICABILITY

The solid electrolytic capacitor according to the present disclosure can suppress the initial ESR to a low level while keeping the cost low. In addition, the solid electrolytic capacitor according to the present disclosure can also suppress the ESR after humidity-resistance testing to a low level. Therefore, it is possible to inexpensively provide an electrolytic capacitor that reduces increase in ESR and achieves high reliability even in use applications in high-humidity environments and use applications in which the influence of humidity is exerted due to long-term use. However, these use applications are mere examples, and use applications of the solid electrolytic capacitor are not limited to these examples.

REFERENCE SIGNS LIST

1: solid electrolytic capacitor
2: capacitor element
3: exterior body
4: anode lead
5: cathode lead
6: anode body
7: dielectric layer
8: cathode part
9: solid electrolyte layer
10: cathode extraction layer
11: first layer
12: second layer
13: separation part
14: first conductive adhesive layer

The invention claimed is:

1. A solid electrolytic capacitor element comprising:
an anode body;
a dielectric layer that is formed on the surface of the anode body; and
a cathode part that covers at least a portion of the dielectric layer,
wherein the cathode part includes a solid electrolyte layer that covers at least a portion of the dielectric layer, and includes a metallic particle-containing layer that contains metallic particles and a cured resin binder in at least a portion of the cathode part,
the metallic particles include first metallic particles each containing silver and second metallic particles each containing silver,
the first metallic particles each includes a core and a silver-containing coating layer that coats the core,
the first metallic particles each has a spherical shape in a sphericity of 0.7 or more and 1 or less, and
each of the second metallic particles is at least one selected from the group consisting of a silver particle and a silver alloy particle.

2. The solid electrolytic capacitor element according to claim 1, wherein the second metallic particles include at least one kind selected from the group consisting of spherical particles and flaky particles.

3. The solid electrolytic capacitor element according to claim 2,
wherein the second metallic particles include the spherical particles and the flaky particles, and
a mass ratio of the spherical particles to the flaky particles (=the spherical particles/the flaky particles) is 20/80 to 80/20.

4. The solid electrolytic capacitor element according to claim 1, wherein an average of proportion of the silver-containing coating layer in the first metallic particles is 0.1 mass % or more and 50 mass % or less.

5. The solid electrolytic capacitor element according to claim 1, wherein a proportion of the first metallic particles in all the metallic particles is 10 mass % or more and 60 mass % or less.

6. The solid electrolytic capacitor element according to claim 1, wherein the core is constituted of an organic particle or an inorganic particle.

7. A solid electrolytic capacitor comprising:
the solid electrolytic capacitor according to claim 1; and
an exterior body that seals the solid electrolytic capacitor element.

8. The solid electrolytic capacitor according to claim 7, further comprising a plurality of the solid electrolytic capacitor elements that are laminated.

9. The solid electrolytic capacitor element according to claim 1, wherein an average particle size of the first metallic particles is 1 μm or more and 10 μm or less.

10. The solid electrolytic capacitor element according to claim 1, wherein an average of proportion of the silver-containing coating layer in the first metallic particles is 10 mass % or more and 50 mass % or less.

11. The solid electrolytic capacitor element according to claim 1, wherein an average particle size of the second metallic particles is 0.1 μm or more and 20 μm or less.

* * * * *